Sept. 26, 1939. A. W. PATTY 2,174,136
TRAILER STEERING MECHANISM
Filed March 18, 1938 2 Sheets-Sheet 2
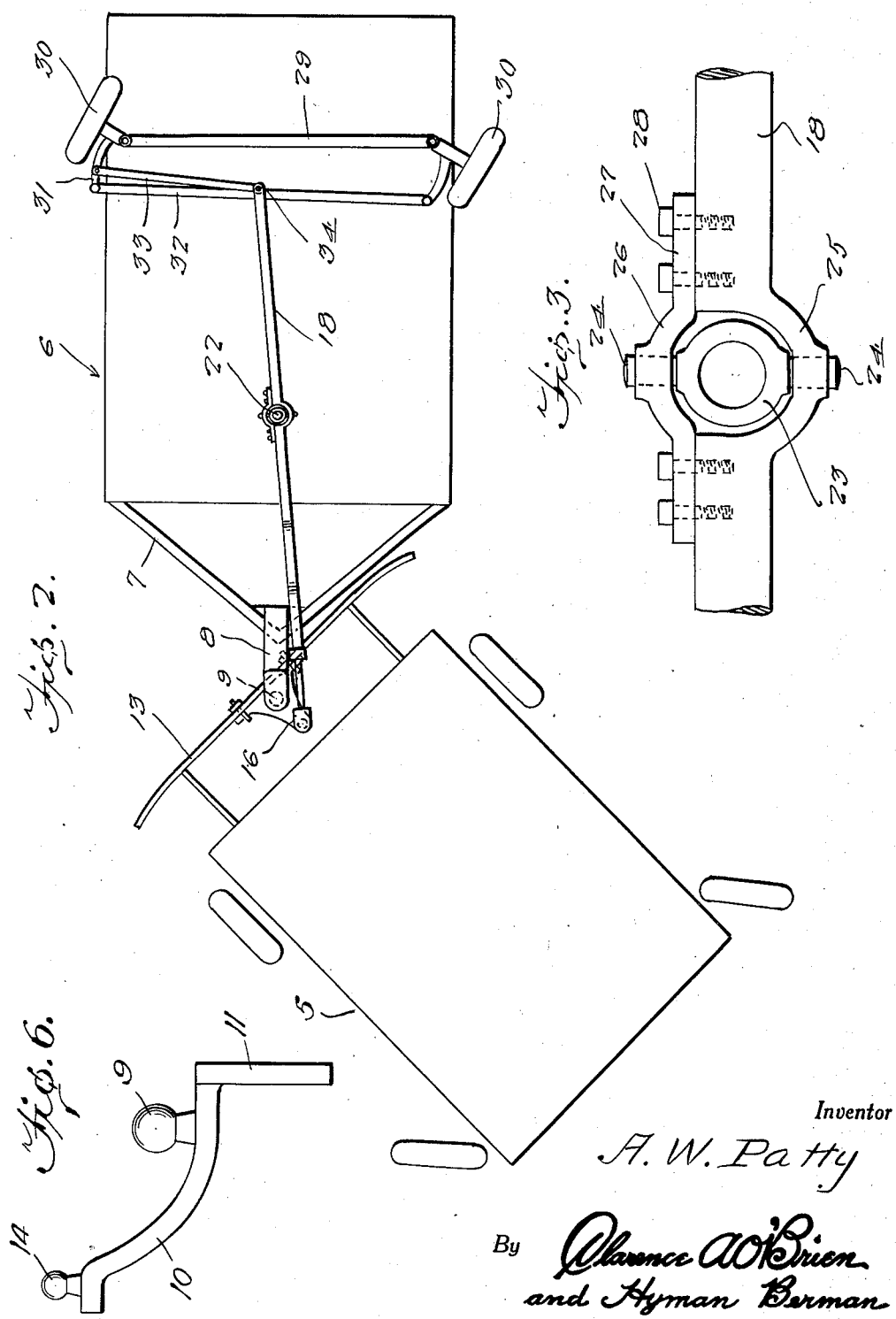
Inventor
A. W. Patty
By Clarence A. O'Brien
and Hyman Berman
Attorneys Patented Sept. 26, 1939

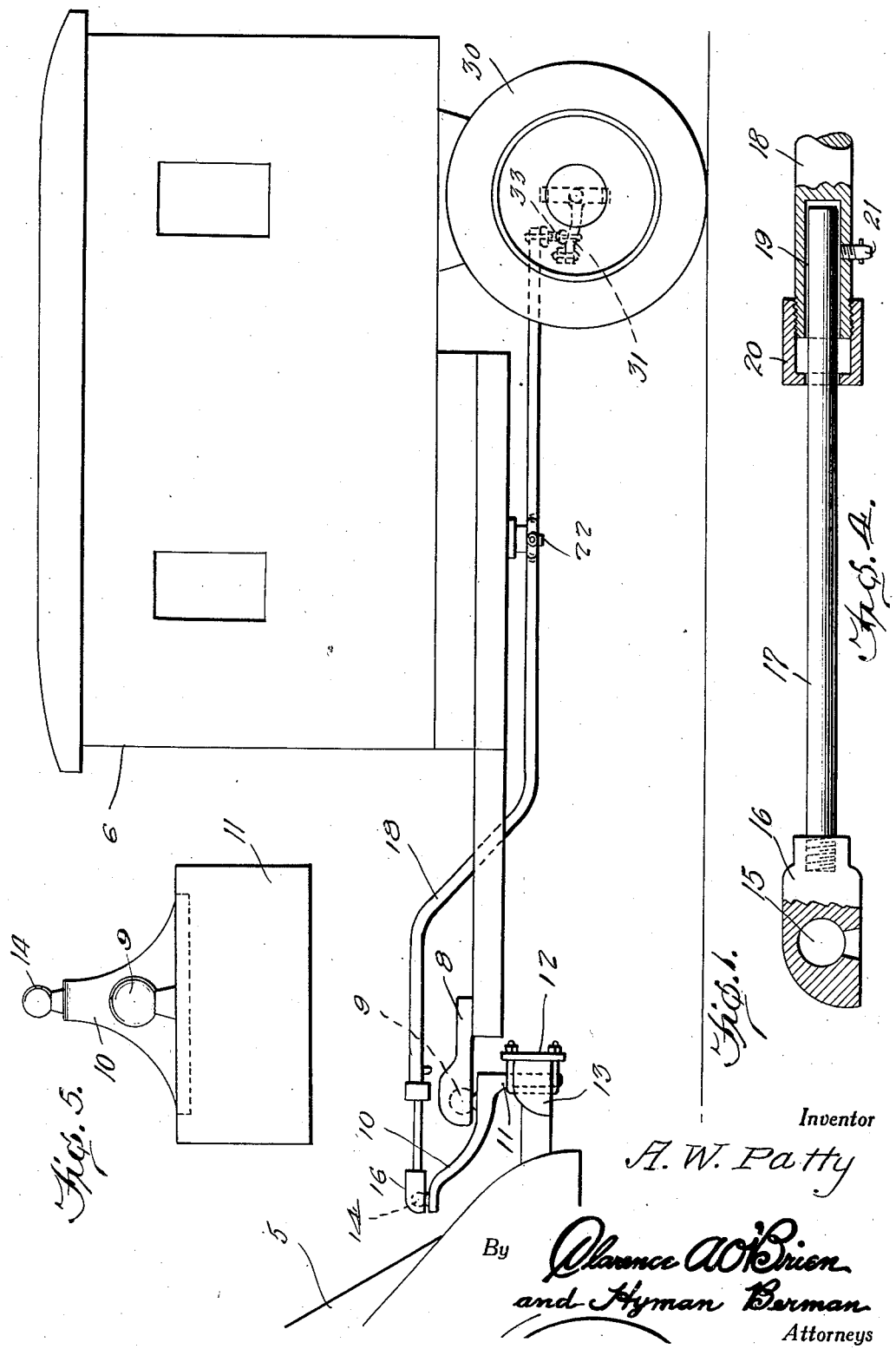

2,174,136

UNITED STATES PATENT OFFICE 2,174,136

TRAILER STEERING MECHANISM

Addison W. Patty, Springfield, Ohio

Application March 18, 1938, Serial No. 196,765

1 Claim. (Cl. 280—33.55)

This invention appertains to new and useful improvements in steering apparatus for trailers, the principal object being to provide means interposed between the lead vehicle and the trailer whereby the trailer is automatically steered in accordance with the steered movements of the lead vehicle.

Other important objects and advantages of the invention will become apparent to the reader of the following specification:

In the drawings:

Figure 1 represents a fragmentary side elevational view showing the trailer equipped with the steering mechanism, Figure 2 is a bottom plan view of the lead vehicle and trailer with the associated steering means, Figure 3 is a fragmentary top plan view of the universal mount for the steering bar, Figure 4 is a side elevational view with parts in section showing the slidable connection between the steering bar and the lead vehicle, Figure 5 is a rear elevational view of the ball supporting coupling mount, and Figure 6 is a side elevational view of the structure shown in Figure 5.

Referring to the drawings wherein like numerals designate like parts, it can be seen in the drawings that numeral 5 generally refers to the lead vehicle while numeral 6 generally refers to the trailer. The trailer 6 is provided with the forwardly extending V-shaped frame 7 from which the arm 8 extends forwardly and this arm is provided with a socket for receiving the ball 9 on the lower end of the upwardly curving arm 10, the lower end of this arm being provided with the shank 11 clamped as at 12 to the rear bumper 13 of the lead vehicle 5.

The upper end of the arm 10 is provided with the ball 14 which is received by the socket 15 in the coupling head 16, this head being interiorly threaded to receive the rod 17.

Numeral 18 represents the elongated steering bar one end of which is bored as at 19 to slidably receive the adjacent end of the rod 17. A cap apertured to receive the rod 17 is threadedly disposed over the adjacent end of the bar 18 to provide a grease closure and a lubricant check fitting 21 is located in the side of the bar 18 and communicating with the bore 19 so that the bore 19 and the interior of the cap 20 can be charged with lubricant.

A stud or pin 22 depends from the underside of the trailer 6 and into the ring 23 which is provided with the outwardly extending trunnion 24 disposed through openings of the laterally curved portion 25 of the bar 18 and the intermediate curved portion 26 of the plate 27, plate 27 being secured by screws 28 to the bar 18. Obviously by removing the plate 27, the bar 18 can be completely removed from the ring 23. The ring 23 is capable of rotating on a horizontal plane on the pin 22, while the bar 18 is capable of swinging on a vertical plane on the trunnions 24.

Numeral 29 represents the usual axle bar of the trailer 6, the wheels 30—30 pivotally connected to the ends thereof being provided with the steering arms 31 connected by the connecting rod 32. A link rod 33 extends from one of the arms 31 to pivotally connect as at 34 to the rear end of the steering arm 18.

It can now be seen, that as the lead vehicle 5 is turned in one direction, the resulting action of the steering bar 18 will exert force on the steerable wheels 30 of the trailer 6 so as to cause the trailer to steer itself in response to the steered action of the lead vehicle.

It is thought that the foregoing sets forth the invention in specific terms and it is to be understood that numerous changes in the shape, size and materials may be resorted to without departing from the spirit and scope of the invention as claimed hereinafter.

Having described the invention what is claimed as new is:

A coupling and steering apparatus for trailer and lead vehicle comprising a forwardly inclined arm, means for mounting the arm on the lead vehicle, a ball on the lower portion of the arm, a tongue extending forwardly from the trailer and provided with a socket for receiving the ball, an elongated bar having one end portion offset upwardly, connecting means between the forward end portion of the bar and the upper end of the arm, and connecting means between the rear end of the bar and the wheels of the trailer to be steered, and a universal mounting between the intermediate portion of the bar and the bottom of the trailer.

ADDISON W. PATTY.